(12) United States Patent
Stroitelev

(10) Patent No.: US 10,639,645 B2
(45) Date of Patent: May 5, 2020

(54) METHOD FOR SEPARATING FINE FRACTURES AND COARSE FRACTURES USING A VACUUM

(71) Applicant: ECOMILL, LLC, Aurora, CO (US)

(72) Inventor: Roman Stroitelev, Barnaul (RU)

(73) Assignee: ECOMILL, LLC, Aurora, CA (US)

( * ) Notice: Subject to any disclaimer, the term of this patent is extended or adjusted under 35 U.S.C. 154(b) by 0 days.

(21) Appl. No.: 16/012,135

(22) Filed: Jun. 19, 2018

(65) Prior Publication Data
US 2019/0381514 A1    Dec. 19, 2019

(51) Int. Cl.
*B02C 23/30* (2006.01)
*B02C 23/26* (2006.01)
*B07B 1/20* (2006.01)
*A01F 12/32* (2006.01)
*B02C 15/00* (2006.01)

(52) U.S. Cl.
CPC .............. *B02C 23/30* (2013.01); *A01F 12/32* (2013.01); *B02C 23/26* (2013.01); *B07B 1/20* (2013.01); *B02C 2015/002* (2013.01)

(58) Field of Classification Search
CPC .. B07B 1/185; B07B 1/20; B07B 7/06; B07B 7/08; B07B 7/083; B07B 11/06; B02C 23/26; B02C 23/30; A01F 12/20; A01F 12/24; A01F 12/26; A01F 12/28; A01F 12/32; A01F 12/38; A01F 12/395; A01F 12/442; A01F 12/446; A01F 12/48; A01F 12/54
See application file for complete search history.

(56) References Cited

U.S. PATENT DOCUMENTS

| | | | |
|---|---|---|---|
| 288,669 A | 11/1883 | Schwarzwaelder | |
| 800,797 A | 10/1905 | Cross | |
| 2,389,715 A | 11/1945 | Beardsley | |
| 2,523,259 A * | 9/1950 | Aber | B07B 1/24 209/284 |
| 3,179,111 A * | 4/1965 | Morrison | A01F 12/00 460/75 |
| 3,587,858 A | 6/1971 | Christianson | |
| 3,727,759 A | 4/1973 | Stevens | |
| 3,928,188 A * | 12/1975 | Link | B01D 29/117 209/250 |
| 4,004,404 A | 1/1977 | Rowland-Hill | |
| 4,066,087 A | 1/1978 | Rodgers | |

(Continued)

FOREIGN PATENT DOCUMENTS

JP        2012106185        7/2012

*Primary Examiner* — Joseph C Rodriguez
(74) *Attorney, Agent, or Firm* — Tyler S. Dunham

(57) ABSTRACT

The embodiments herein provide a method for separating fine fractures from coarse fractures, comprising the steps of generating an area of low air pressure beneath a sieve positioned within a centrifugal scattering device followed by ingesting a mixture of air, coarse fractures, and fine fractures into the centrifugal scattering device. The method would preferably continue by causing a guide to rotate around an interior cavity of the centrifugal scattering device while forcing fine fractures through the sieve using the low air pressure and gravity, into a fine fracture collector. Preferably coarse fractures are permitted to travel along the sieve, guided by the guides, to a coarse fracture collector which is separate from the fine fracture collector.

17 Claims, 7 Drawing Sheets

(56) References Cited

U.S. PATENT DOCUMENTS

| | | | | |
|---|---|---|---|---|
| 4,202,759 A * | 5/1980 | Krolopp | ............... | B04B 5/12 |
| | | | | 209/234 |
| 4,397,319 A * | 8/1983 | Schuhmacher | ........... | B07B 9/00 |
| | | | | 460/100 |
| 4,597,977 A | 7/1986 | Brown | | |
| 4,711,075 A | 12/1987 | Strong | | |
| 4,875,891 A * | 10/1989 | Turner | ............... | A01F 12/24 |
| | | | | 460/110 |
| 5,051,169 A | 10/1991 | King | | |
| RE33,752 E * | 11/1991 | Poss | ............... | A22C 17/04 |
| | | | | 209/262 |
| 5,458,246 A * | 10/1995 | Thom, Jr. | ............... | B07B 1/20 |
| | | | | 209/300 |
| 5,570,790 A * | 11/1996 | Rumpf | ............... | B07B 1/20 |
| | | | | 209/291 |
| 5,593,042 A * | 1/1997 | Keller | ............... | B07B 1/20 |
| | | | | 209/261 |
| 5,758,778 A * | 6/1998 | Kershner | ............... | B07B 1/20 |
| | | | | 209/283 |
| 6,277,424 B1 | 8/2001 | Kwangwaropas | | |
| 6,325,713 B1 | 12/2001 | Haar | | |
| 6,443,835 B1 | 9/2002 | Imel | | |
| 6,516,714 B2 | 2/2003 | Warmack | | |
| 7,059,961 B2 | 6/2006 | Schenk | | |
| 7,093,718 B2 | 8/2006 | Kato | | |
| 7,896,163 B2 * | 3/2011 | Kato | ............... | B07B 7/06 |
| | | | | 209/273 |
| 8,087,348 B2 * | 1/2012 | Maupin | ............... | A23B 7/06 |
| | | | | 99/348 |
| 8,943,955 B2 | 2/2015 | Borrell | | |
| 9,456,550 B2 | 10/2016 | Suen | | |
| 9,554,517 B2 * | 1/2017 | Johnson | ............... | A01F 12/18 |
| 9,629,310 B2 * | 4/2017 | Bilde | ............... | A01F 12/446 |
| 9,718,006 B2 * | 8/2017 | Lee | ............... | B01D 29/23 |
| 9,872,439 B2 * | 1/2018 | Pohlmann | ............... | A01D 41/1243 |
| 2006/0237347 A1 | 10/2006 | Kato | | |
| 2016/0207806 A1 | 7/2016 | Oude Grotebevelsborg | | |

\* cited by examiner

METHOD FOR SEPARATING FINE FRACTURES AND COARSE FRACTURES USING A VACUUM

CROSS-REFERENCE TO RELATED APPLICATIONS

This application does not claim priority to any co-pending applications.

TECHNICAL FIELD

Embodiments generally relate to methods for the processing of agricultural products, specifically the sifting or sieving of coarse and fine fractures of grain, often used in flour production.

BACKGROUND OF THE ART

The sifting or sieving of coarse and fine fractures of grain has traditionally been done with very large and complicated equipment. This results in fewer grain mills being available for use, due to their start-up costs and complexity. With only a few large mills available, resulting product must be shipped for long distances before reaching the customer, resulting in higher shipping costs. Further, locally-grown grains may not be usable by local bakeries, restaurants, and breweries because no grain mill is available locally to mill the grain.

Traditional sifters do not utilize the sieving area in a very efficient manner, or in other words have little sifting surface available and used due to the clogging of sieves by small grinding products. Also many types of different sieves are necessary when making different types of flour with traditional sifters. Traditional sifters also require a large amount of sieving area. Finally, because traditional sifters require special purifiers, with wear and tear focused on particular areas of the sieve, the sieves must be regularly replaced with traditional sifters and this process can take up to 24 hours.

SUMMARY OF THE EXEMPLARY EMBODIMENTS

Exemplary embodiments provide a method for separating fine grain fractures from coarse grain fractures using a centrifugal scattering device as a replacement to the traditional sifter mill, preferably using a method which utilizes a vacuum to draw fine grain fractures through the sieves. In the exemplary embodiments, the aspiration surfaces of the sieves are greatly reduced compared to traditional sifter mills. In other words, much less sieve area is necessary to separate the same amount of product. In some applications, the exemplary embodiments use $1/20^{th}$ of the sieving aspirations surfaces of a traditional sifter mill. Vibration has been minimized, along with the equipment dimensions and power consumption. In an exemplary embodiment, flour of three different grades can be produced with only three types of sieves. The sieves are easily replaceable in a minimal amount of time. The product (coarse and fine fractures of grain) are transported through a stream of fluid (air) which is generally kept under a vacuum throughout the centrifugal scattering device.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the terms fine fracture and coarse fracture refer to the resulting product following an initial mill process when processing grain, sometimes after using a roller mill (as well as preparation and cleaning steps). After an initial processing step, the grain is now preferably a combination of the fine fractures (ex. endosperm and germ) and the coarse fractures (ex. outer kernel and bran).

Figure 1:
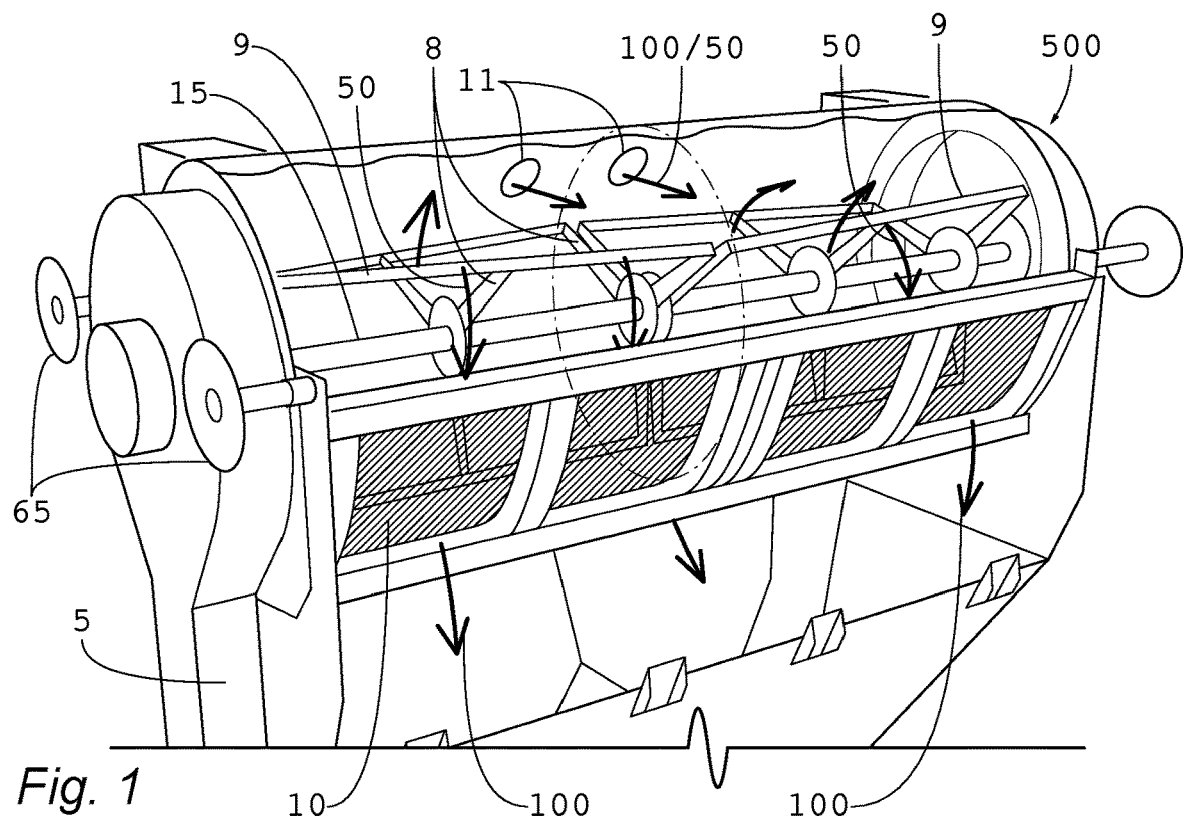
FIG. 1 is a side perspective illustration showing the interior operations of an exemplary centrifugal scattering device using two scattering devices side by side.

FIG. 1 is a side perspective illustration showing the interior operations of an exemplary centrifugal scattering device using two scattering devices 500 side by side. A mixture of air, coarse grain fractures 50, and fine grain fractures 100 preferably enters the device through the inlet 11. In some embodiments, the air has a flowrate of approximately 22-25 meters per second at the inlet 11 and output sleeve 6. There is generally little to no airflow through output sleeve 7 in a preferred embodiment. The air may generally remain flowing through the interior of the device at a lower speed than found at the inlet 11 and output sleeves 6, depending on where the airspeed measurement is being taken. A plurality of rotors 8 may rotate around a central axle 15 which defines the axis of rotation for the device 500. A guide 9 is preferably positioned at the end of the rotors 8. A preferred rotor 8 has a proximal end which is attached to the central axle 15 and an opposing distal end which is attached to a guide 9.

Generally speaking, the bottom interior wall of the device 500 may be defined by one or more sieves 10, which are preferably a mesh-like material with openings having a particular size that is chosen based on the size of the coarse/fine grain fractures to be separated. Each sieve 10 may contain a combination of a frame structure with an interconnecting mesh, screen, or filter that connects with the frame structure. In operation of the device, the guides 9 travel along the convex sieve 10 to distribute the fractures 100/50 along the sieve 10 so that fine grain fractures 100 may pass through the sieve 10 while coarse grain fractures 50 may continue along the sieve 10 until reaching the coarse fracture collector 5, which is preferably positioned on the opposing end of the device 500 as the inlet 11. For the embodiment shown using a pair of separators 500, it is preferable that the inlets 11 are positioned near the center of the device while a coarse fracture collector 5 is positioned at each end of the device.

Figure 2:
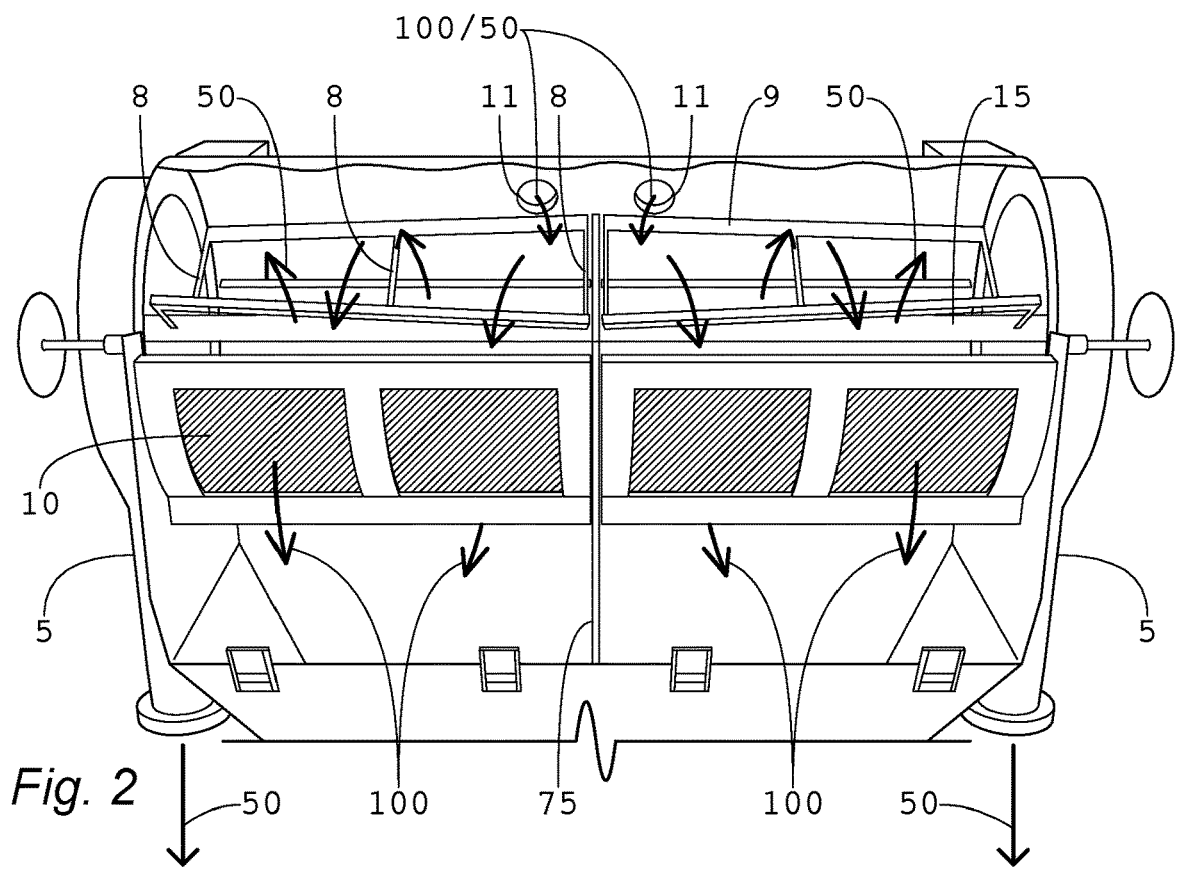
FIG. 2 is a front illustration showing the interior operations of the centrifugal scattering device of FIG. 1.

FIG. 2 is a front illustration showing the interior operations of the centrifugal scattering device of FIG. 1. The guides 9 are preferably not oriented parallel to the central axle 15, and are instead angled as shown (also shown specifically in FIGS. 2 and 3). This angle of the guides 9, along with the direction of rotation of the central axle 15 and rotors 8, causes the fractures 100/50 to travel in the corkscrew or helical path shown, wrapping around the interior surfaces of the device 500, alternating between the interior surfaces of the convex sieve 10 and the concavely shaped cover plate 3 while also translating horizontally towards a coarse fracture collector 5.

Figure 3:
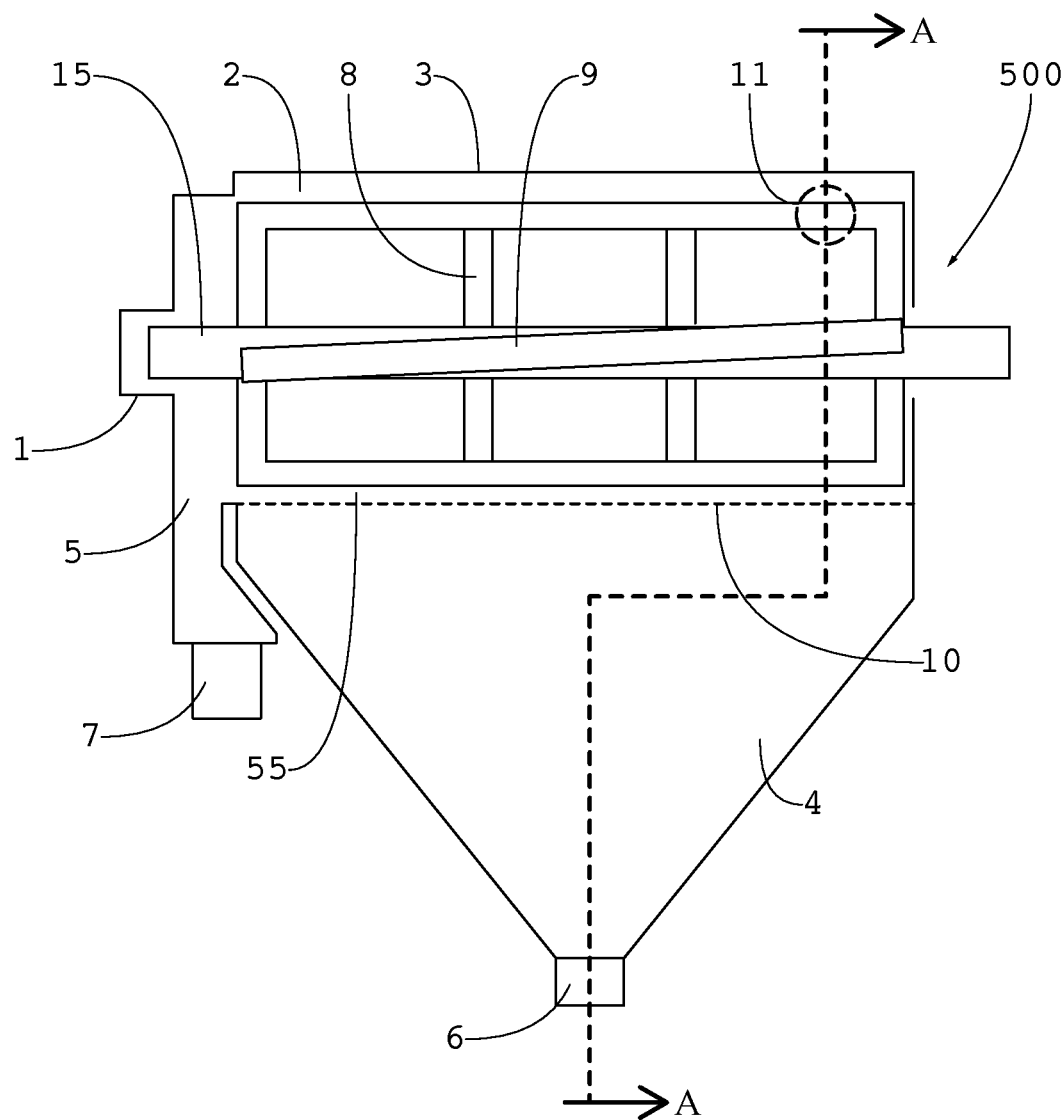
FIG. 3 is a front simplified schematic view of another embodiment of the centrifugal scattering device using only one centrifugal scattering device and indicating the location of section line A-A.

FIG. 3 is a front simplified schematic view of another embodiment of the centrifugal scattering device 500 using only one centrifugal scattering device and indicating the location of section line A-A. The guides 9 are preferably angled relative to the central axis 15, and attached to the central axis 15 with the rotors 8. A gap 55 is defined as the space between the sieve 10 and the guide 9 (when it travels along the sieve 10). The coarse fracture collector 5 is directs the coarse fractures 50 into the output sleeve 7 (or airlock, depending on the particular application) for removal or further processing. A cover plate 3 may connect to a housing 1 which contains the interior components of the device 500.

A fine grain fracture collector 4 will preferably collect the fine grain fractures 100 and direct them into the output sleeve 6. The fractures 50/100 generally enter the inlet 11 in a direction that is generally perpendicular to the central axle 15. As oriented here, the inlet 11 is generally perpendicular to the page and fractures 50/100 exiting the inlet 11 would also be generally perpendicular to the page. As described further below, a fan 80 is preferably in gaseous communication with the fine grain fracture collector 4 to create a low pressure vacuum within the collector 4 to suck or draw fine fractures 100 through available openings in the sieves 10.

Figure 4:
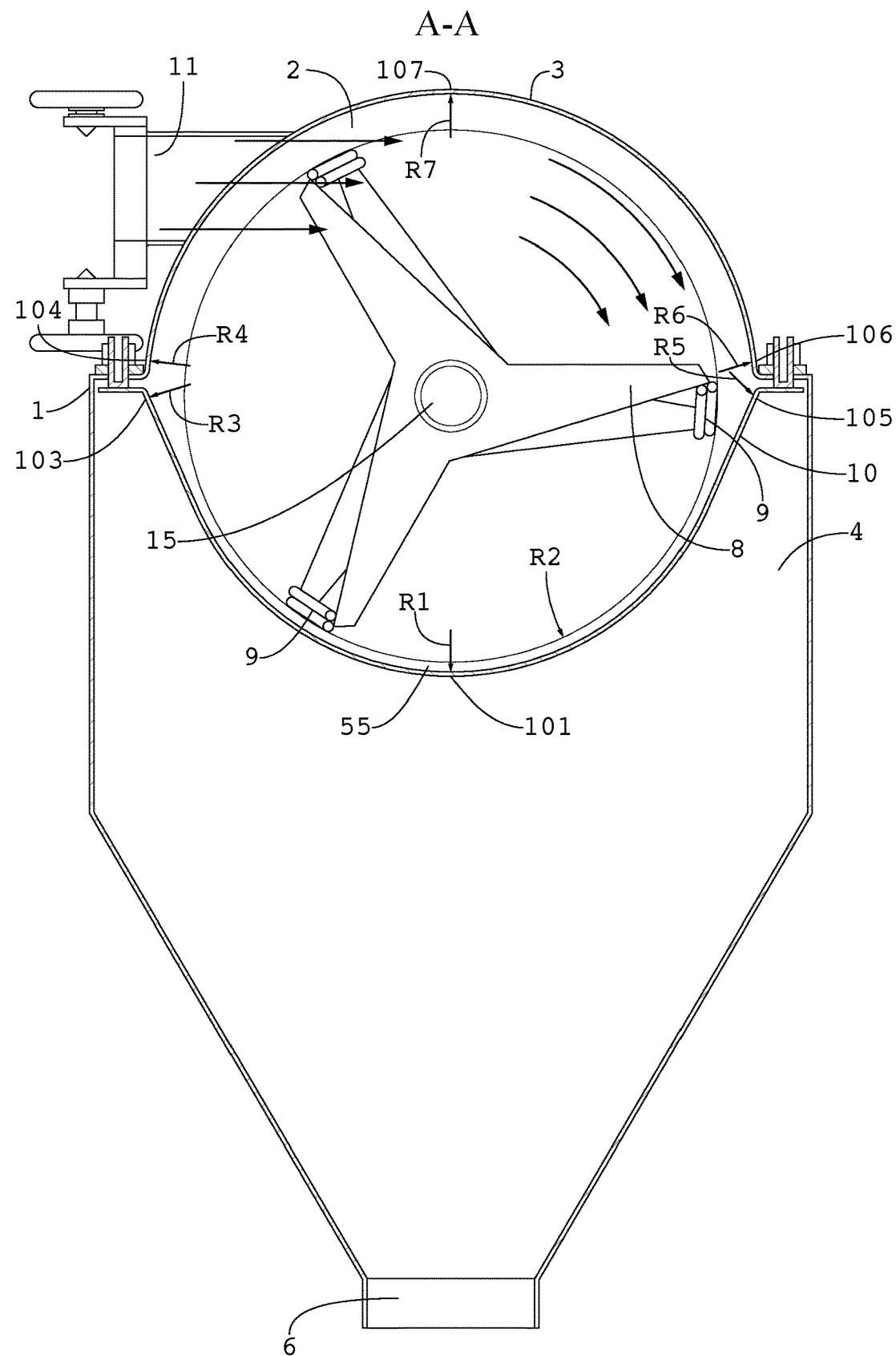
FIG. 4 is a section view taken along the section line A-A.

FIG. 4 is a section view taken along the section line A-A. The fractures 50/100 generally enter the inlet 11 and then continue into the sorting camera 2 where they can strike a number of surfaces including the guide 9, rotor 8, or interior surfaces of the cover plate 3. Fractures 50/100 can then scatter while being forced by the flow of air and the movement of the guides 9 through the device. The cover plate 3 may attach to the housing 1 and preferably has a curvature that is designed to work with the curvatures of the convex sieve 10.

The convex sieve 10 may have a radius of curvature R1 defined generally near the mid-point 101 of the bottom of the convex interior surface of the sieve 10. The mid-point 101 generally is the lowest point on the sieve 10 and also generally lies at the center of the sieve 10 (which sometimes also aligns with the center of the entire device 500). The guides 9 preferably have a radius of curvature R2 defined as the outer radius of the circular travel position of the guides 9 as they rotate about the central axle 15. Generally speaking, the radii R1 and R2 may be close to the same value, although not necessarily equal. In some embodiments, radius R2 may be slightly smaller than radius R1, by up to 10%. A gap 55 may be defined as the space between the sieve 10 and the guide 9 (when it travels along the sieve 10). The smallest gap 55 is generally found at the mid-point 101. The gap 55 between the sieve 10 and the guide 9 would then preferably increase as one moves from the mid-point 101 of the sieve 10 to the edge portions 103/105 of the sieve 10, providing a larger gap between the guides 9 and the edge portions 103/105 when compared to the gap 55 at the mid-point 101.

An exemplary sieve 10 would comprise a pair of edge portions 103/105 which are located on opposing sides of the mid-point 101, near the connection of the sieve 10 with the cover plate 3. A radius of curvature R3 may be defined as the radius of the interior of edge portion 103. Another radius of curvature R5 can be similarly defined as the radius of the interior of edge portion 105. In a preferred embodiment, R3 is substantially equal to R5, while both R3 and R5 are preferably slightly larger than R1.

An exemplary cover plate 3 would comprise a pair of edge portions 104/106 which are located on opposing sides of the cover plate mid-point 107, near the connection of the sieve 10 with the cover plate 3. A radius of curvature R4 may be defined as the radius of the interior of edge portion 104. Another radius of curvature R6 can be similarly defined as the radius of the interior of edge portion 106. Generally speaking, in a preferred embodiment R7, R6, and R4 would be substantially equal, or within 5% of each other. Also in a preferred embodiment, no matter the relationship between the cover plate 3 radii (R7, R6, and R4), R5 is substantially equal to R6 while R4 is substantially equal to R3.

An exemplary sieve 10 would have R1 which is different from R5 and R3, with a smooth transition from R1 to the different (usually larger radius) found in R5 and R3. In other words, the sieve 10 should have a varying radius, with the smallest radius being placed near mid-point 101 and the largest radius being placed near edge portions 105/103. A plurality of different convex sieves 10 can be used having different dimensions for the sieve radii (R1, R3, and R5) which can also provide different values for the gap 55.

In this embodiment, the cover plate 3 is positioned above the sieve 10 so that in combination, the two components (cover plate 3 and sieve 10) form a closed curve, which can be a circle or an oval. In some embodiments, the central axle 15 rotates at a speed of approximately 700 revolutions per minute (rpm). However, embodiments have found adequate results with anywhere between 120-800 rpm. Preferably, the central axle 15 rotates at least 200 rpm and preferably somewhere between 600 and 750 rpm. The fast rotations of the central axle 15 causes the guides 9 to rotate quickly and cause the grain fractures 50/100 to contact various interior surfaces of the underside of the cover plate 3 as well as distributing the fractures across the available areas of the sieve 10.

Figure 5:
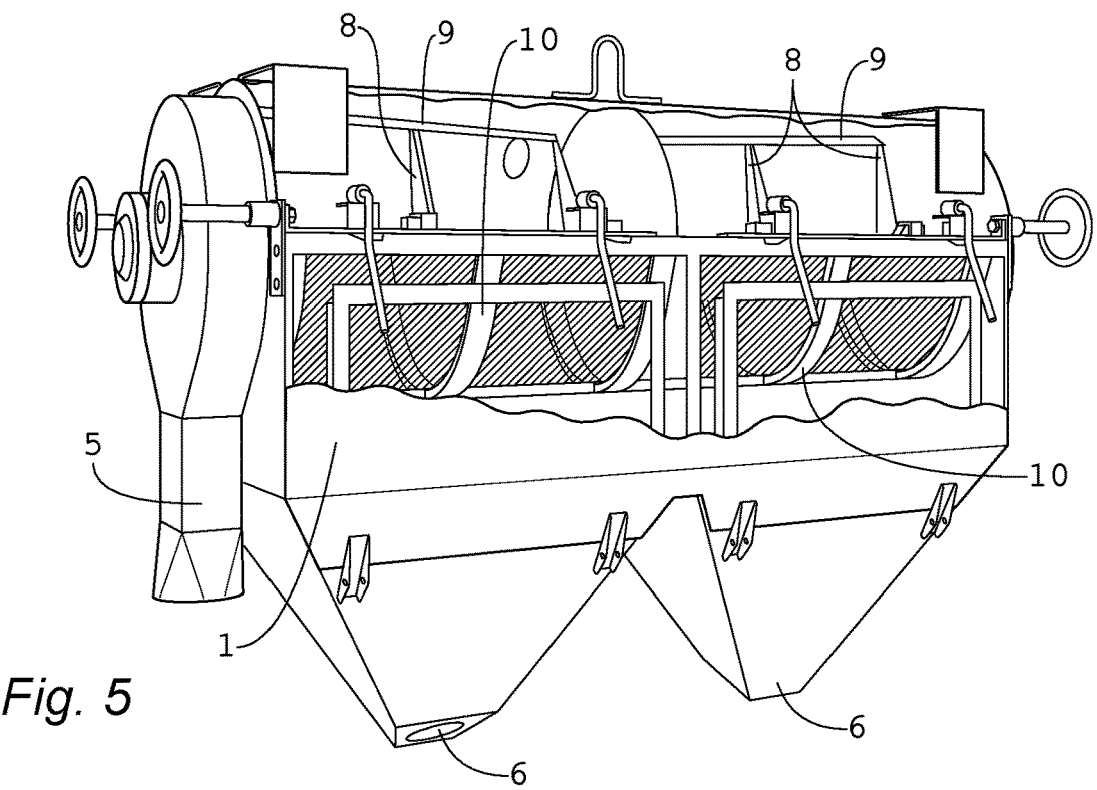
FIG. 5 is a side perspective view of an exemplary centrifugal scattering device using two scattering devices side by side where a portion of the housing has been hidden to show the interior components.

FIG. 5 is a side perspective view of an exemplary centrifugal scattering device 500 using two scattering devices side by side where a portion of the housing 1 has been hidden to show the interior components. Here you can see the positioning of the rotors 8 which connect to the guides 9 which travel approximately half a rotation above the convex sieves 10 and the remaining half of the rotation traveling just below the cover 3.

Figure 6:
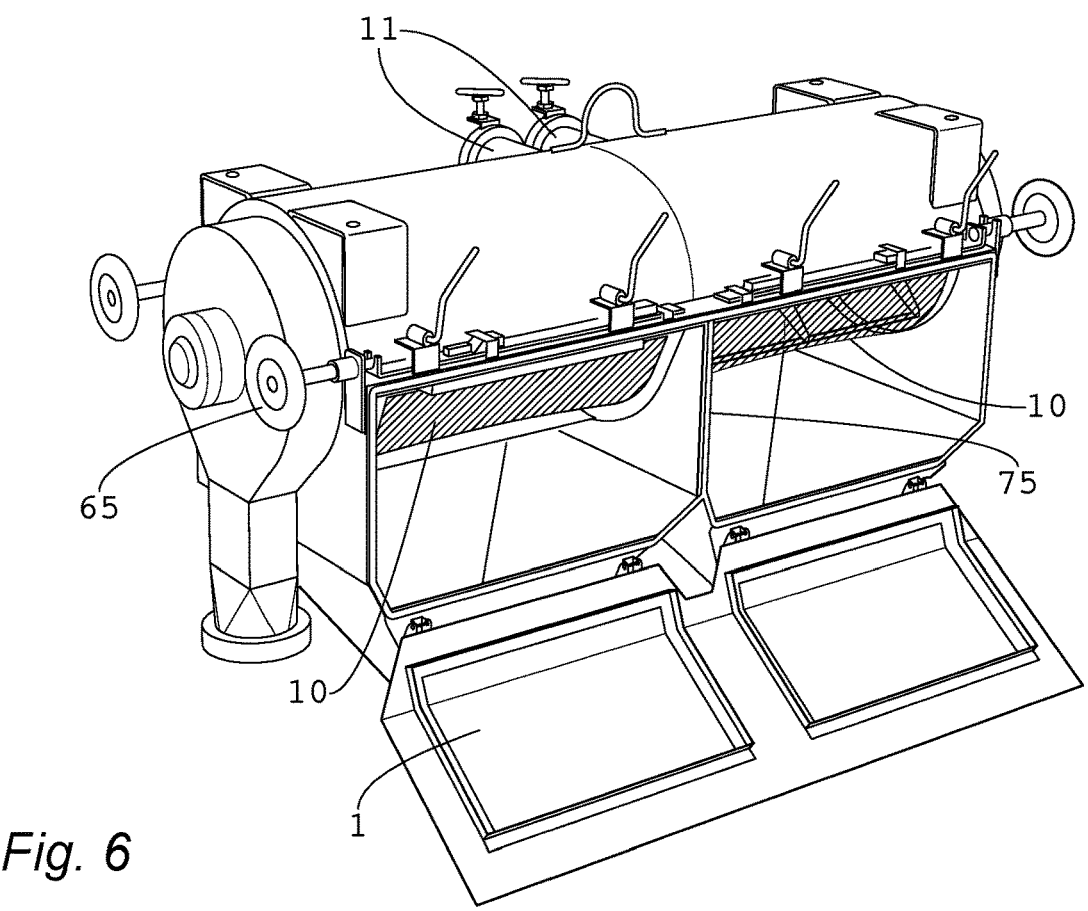
FIG. 6 is a side perspective view of the embodiment from FIG. 5 where the housing has been opened to show the convex sieves.

FIG. 6 is a side perspective view of the embodiment from FIG. 5 where the housing 1 has been opened to show the removable convex sieves 10. In this embodiment, attachment devices 65 are used to removably attach the convex sieves 10 to the housing 1. Attachment devices 65 can take on many forms, including but not limited to screws, fasteners, rods, clamps, or similar.

Figure 7:
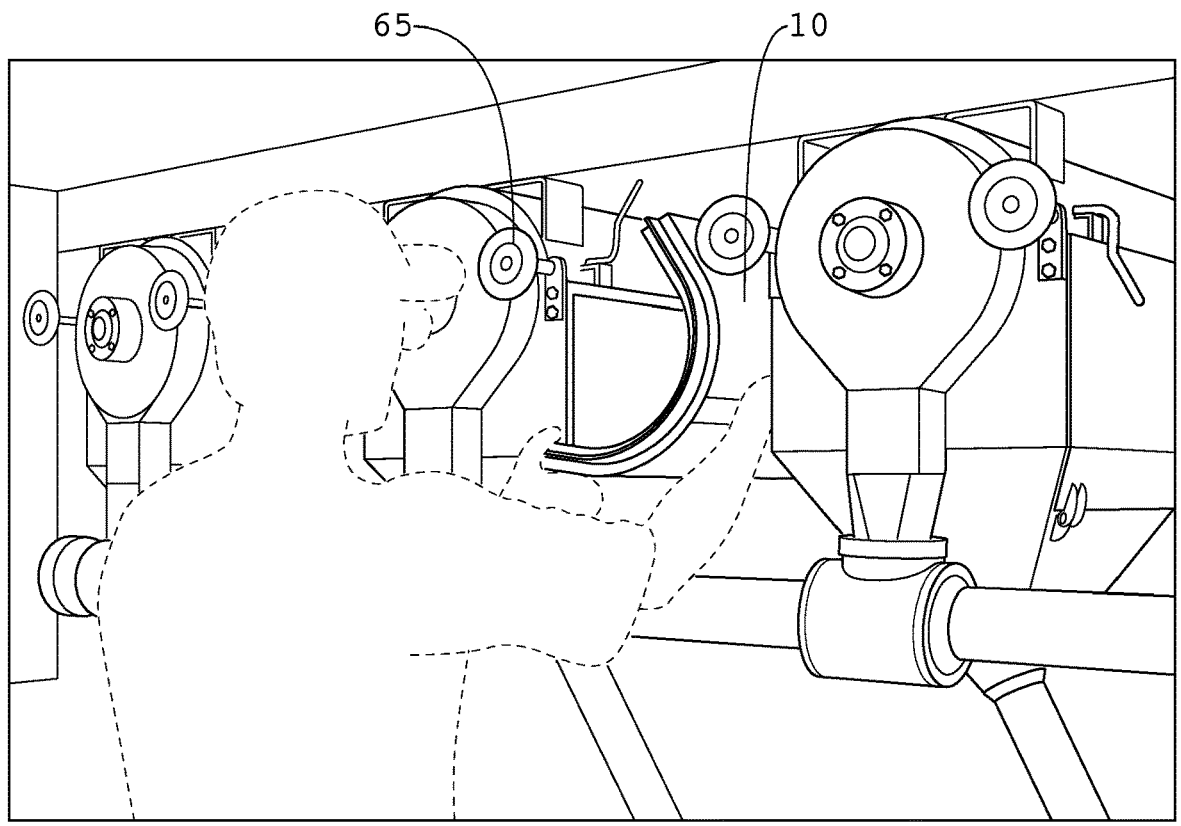
FIG. 7 is an illustration of a worker that is replacing a convex sieve.

FIG. 7 is an illustration of a worker that is replacing a convex sieve 10 after loosening or removing the attachment device 65.

Figure 8:
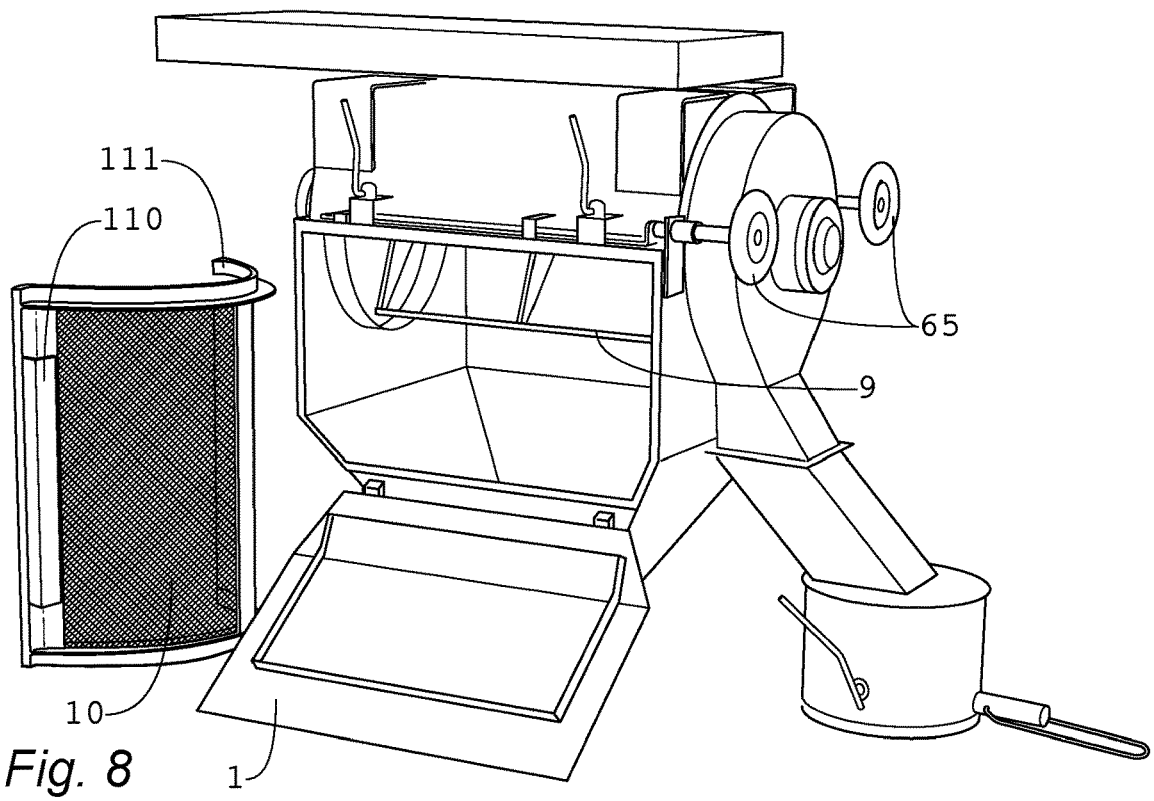
FIG. 8 is a side perspective view of a centrifugal scattering device using a single scattering device where the sieve has been removed.

FIG. 8 is a side perspective view of a centrifugal scattering device 500 using a single scattering device where the sieve 10 has been removed. In this embodiment, the sieve 10 contains a first edge 110 with a lip that hangs from the interior of the device 500, and a second edge 111 that engages with the attachment devices 65. Thus, to remove the sieve 10, a user would disengage the attachment devices 65 and then lift the first edge 110 having the lip, and lift the sieve 10 and remove from the device 500.

Figure 9:
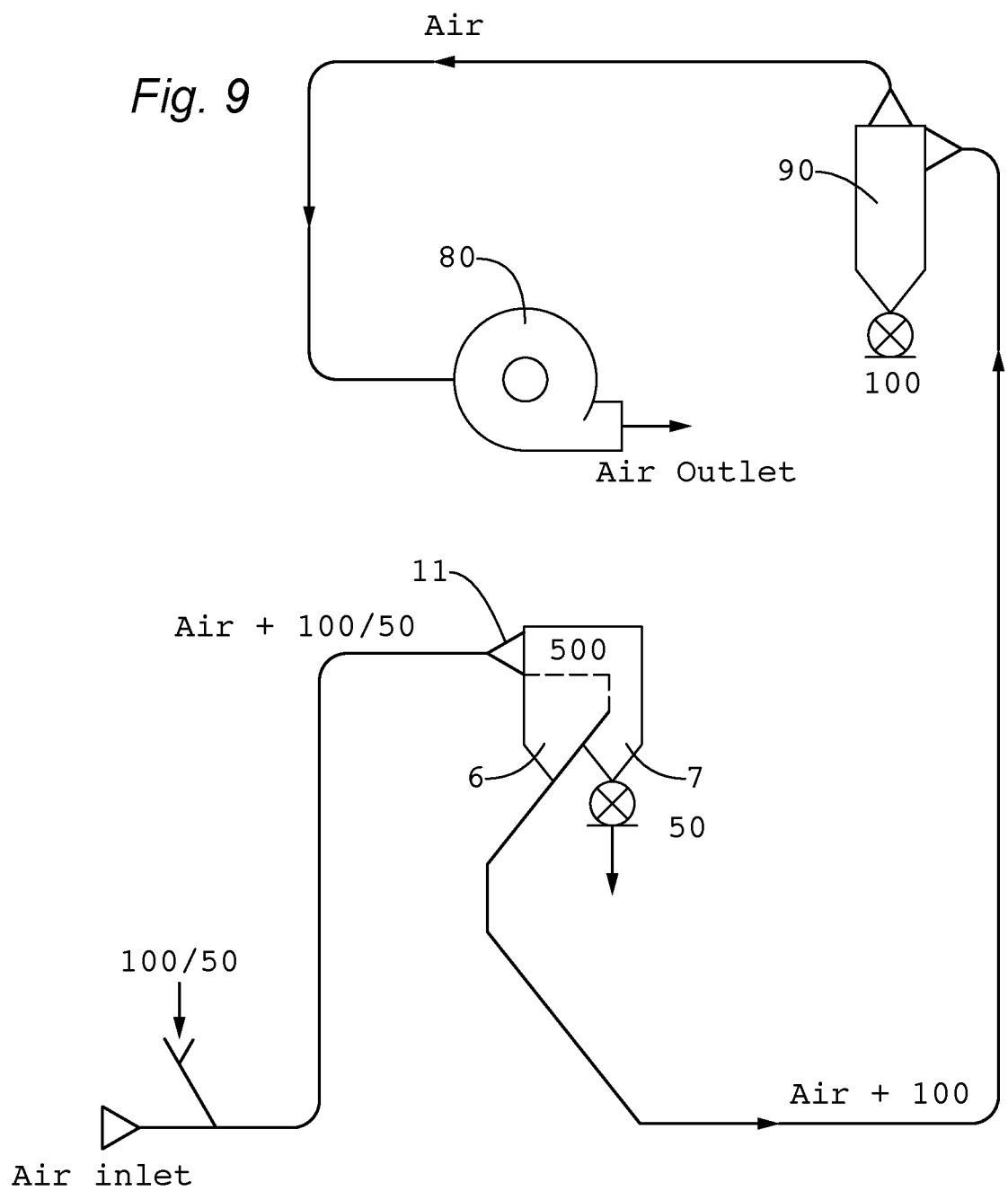
FIG. 9 is a product flow schematic showing the flow of air, coarse fractures, and fine fractures through the centrifugal scattering device and other related components.

FIG. 9 is a product flow schematic showing the flow of air, coarse fractures 50, and fine fractures 100 through the centrifugal scattering device 500 and other related components. Initially, a combination of coarse grain fractures 50 and fine grain fractures 100 are mixed with air coming from an air inlet. A fan 80 is used to create a vacuum preferably through each component in the system, but mostly through the centrifugal scattering device 500. The fan 80 preferably creates an area of low pressure underneath the sieves 10 and near the outlet 7, which draws the fine fractures 100 through the sieves 10. The coarse fractures 50 may travel along the sieve until falling into the collector 5 to be directed into the output sleeve 7, mostly done by gravity and not the flow of air or vacuum. As shown and described above, the fine grain fractures 100 are separated from the coarse grain fractures 50 in the centrifugal scattering device 500 while remaining under a vacuum and directed into the output sleeves 6 and 7 respectively.

From here, the coarse grain fractures 50 can be removed for waste or further processing. A product pipeline would then continue to a device 90 which separates the fine grain fractures 100 from the air. From here, the fine grain fractures 100 can be removed or processed further. The air would preferably then continue through the fan 80 and exit out of the air outlet. In some embodiments, filters may be used to clean the air prior to the air outlet.

As noted above, the fan 80 and connecting product pipelines preferably create a vacuum through the centrifugal scattering device 500. In other words, the fan 80 and connecting product pipelines preferably create low pressure at the outlet 6 (or at least pressure that is lower than the pressure at the inlet 11), beneath the sieves 10. It could also be said that low pressure is created in the fine grain fracture collector 4. The low pressure beneath the sieves 10 causes fine fractures 100 to be vacuumed or sucked through the various openings in the sieves 10, increasing efficiency, speed, and improving the cleanliness of the sieves 10 and the need to service/maintain them as frequently. The flow of air in combination with the fine fractures 100 through the centrifugal scattering device 500 (specifically the sieves 10) helps to provide the maximum amount of aspiration surfaces on the sieves 10 to improve the efficiency of the sieves 10 and prevent clogging and/or damage. However, as shown above, the sieves 10 of the exemplary embodiments herein would be easily replaceable by opening the housing 1 and removing the attachment devices 65.

Figure 10:
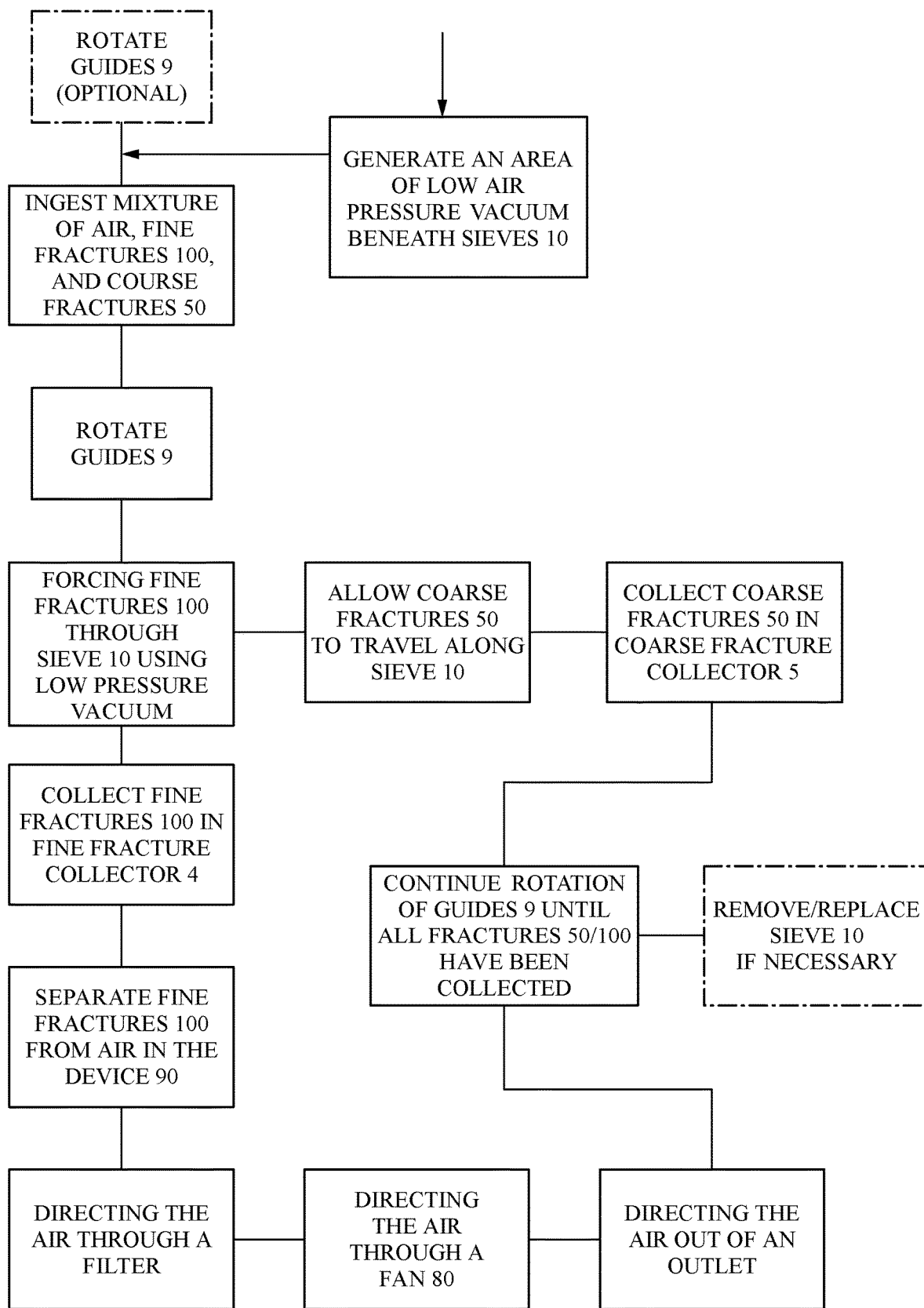
FIG. 10 is a flowchart for performing the steps in the method of separating fine and grain fractures using a vacuum through a sieve.

FIG. 10 is a flowchart for performing the steps in the method of separating fine and grain fractures using a vacuum through the sieve 10.

As shown and described herein, exemplary embodiments also provide a method for separating coarse and fine grain fractures. Initially, a mixture of air, coarse fractures, and fine fractures may be ingested into a centrifugal scattering device. Preferably, the step of ingesting is performed through the cover plate 3 and above the central axle 15. Also preferably, the step of ingesting is performed so that the mixture is travelling in the same direction as (or generally parallel to) the direction of rotation of the guides 9. The next step is generally causing the guide 9 to rotate around the interior cavity of the device 500 as shown and described above. The method continues by allowing the fine fractures 100 to pass through the sieve 10 while allowing coarse fractures 50 to travel along the sieve, guided by the guides, into a coarse fracture collector 5.

At this point, a mixture of air and fine fractures 100 may be directed into an outlet pipeline for transfer to a device 90 which removes the air from the fine fractures 100 so that the fine fractures 100 can be removed for further processing or packaging. The air may be filtered and then pass through a fan 80 before being exhausted. Throughout this method, the device 500 is generally held under a vacuum, with air moving through the device 500.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A method for separating fine fractures from coarse fractures, comprising the steps of:

ingesting a mixture of air, coarse fractures, and fine fractures into the centrifugal scattering device;

causing at least one guide to rotate around an interior cavity of the centrifugal scattering device;

forcing fine fractures through a sieve which only covers a bottom portion of the interior cavity and does not cover a top portion of the interior cavity;

collecting the fine fractures underneath the sieve with a fine fracture collector; and allowing coarse fractures to travel along the sieve, guided by the at least one guide, into a coarse fracture collector which is separate from the fine fracture collector;

wherein the ingesting step is performed by ingesting the air, coarse fractures, and fine fractures horizontally through a cover plate which forms a closed curve with the sieve.

2. The method of claim 1 further comprising the step of:
directing a combination of the collected fine fractures and air into an outlet pipeline.

3. The method of claim 2 further comprising the step of:
removing the collected fine fractures from the air.

4. The method of claim 3 further comprising the step of:
filtering the air once the collected fine fractures have been removed.

5. A method for separating fine fractures from coarse fractures, comprising the steps of:

attaching a sieve to a cover plate to form a closed curve with the sieve positioned below the cover plate;

ingesting a mixture of air, coarse fractures, and fine fractures through the cover plate;

causing at least one guide to rotate around the closed curve;

sucking fine fractures through the sieve using a vacuum;

collecting the fine fractures underneath the sieve with a fine fracture collector; and allowing coarse fractures to travel along the sieve, guided by the at least one guide, into a coarse fracture collector which is separate from the fine fracture collector.

6. The method of claim 5 wherein:
the step of ingesting the mixture into the centrifugal scattering device is performed by ingesting the mixture into the device with the same direction of rotation around the device as the rotation of the at least one guide.

7. The method of claim 5 further comprising the step of:
removing attachment devices which secure the sieve in place;
removing the sieve; and
installing a replacement sieve by inserting a replacement sieve and replacing the attachment devices to secure the replacement sieve in place.

8. The method of claim 7 wherein:
the attachment devices contain threads which are rotated in order to secure the sieve in place.

9. The method of claim 7 wherein:
the at least one guide is rotated by a central axle.

10. A method for separating fine fractures from coarse fractures using a centrifugal scattering device having a cover plate and sieve which are positioned adjacently to create a closed curve around which at least one guide travels, the method comprising the steps of:

creating an area of low air pressure underneath the sieve;

ingesting a mixture of air, coarse fractures, and fine fractures through the cover plate;

allowing the at least one guide to scatter the fine fractures and coarse fractures across the sieve as the at least one guide rotates around the closed curve;

allowing fine fractures to pass through the sieve;

collecting the fine fractures underneath the sieve with a fine fracture collector; and collecting coarse fractures in a coarse fracture collector which is separate from the fine fracture collector;

wherein the step of allowing the at least one guide to scatter the fine fractures is performed by allowing the at least one guide to travel closer to the sieve than to the cover plate.

11. The method of claim 10 wherein:
the step of ingesting the mixture is performed at a first end of the centrifugal scattering device; and
the step of collecting coarse fractures in a coarse fracture collector is performed at an opposing second end of the centrifugal scattering device.

12. The method of claim 10 further comprising the step of:
directing a combination of the collected fine fractures and air into an outlet pipeline.

13. The method of claim 12 further comprising the step of:
removing the fine fractures from the air.

14. The method of claim 1 further comprising the steps of disconnecting the sieve from the cover plate and replacing the sieve by re-connecting the sieve to the cover plate.

15. The method of claim 5 further comprising the steps of:
allowing the fine and course fractures to pass through a second gap, said second gap located between the at least one guide and the cover plate and having a second gap distance D2;
wherein D2 is greater than D1.

16. The method of claim 5 further comprising the step of:
allowing the at least one guide to travel closer to the sieve than to the cover plate while rotating around the closed curve.

17. The method of claim 10 wherein the step of ingesting is further performed near the midpoint of the centrifugal scattering device.

* * * * *